June 30, 1970    R. J. IFIELD    3,517,690

STATIC FRICTION FREE VALVE

Filed Dec. 7, 1967

INVENTOR
Richard Joseph Ifield
BY
ATTORNEYS

# United States Patent Office 3,517,690
Patented June 30, 1970

3,517,690
STATIC FRICTION FREE VALVE
Richard Joseph Ifield, Beecroft, New South Wales,
Australia, assignor to Joseph Lucas (Industries)
Limited, Birmingham, England, a British company
Filed Dec. 7, 1967, Ser. No. 688,725
Int. Cl. F16k 29/02
U.S. Cl. 137—330                                    2 Claims

ABSTRACT OF THE DISCLOSURE

In a valve having an angularly movable valve member static friction between this and the body part is removed by an axially movable sleeve disposed between the body part and the valve member, there being means for imparting axial reciprocating motion to the sleeve.

---

This invention relates to valves having parts which are relatively movable for operating the valve and means for causing relative movement of the parts in a direction other than that which occurs during operation of the valve, to remove static friction between said parts.

The object of the invention is to provide a valve of the kind referred to in a convenient, simple and entirely effective form.

Figure 1:
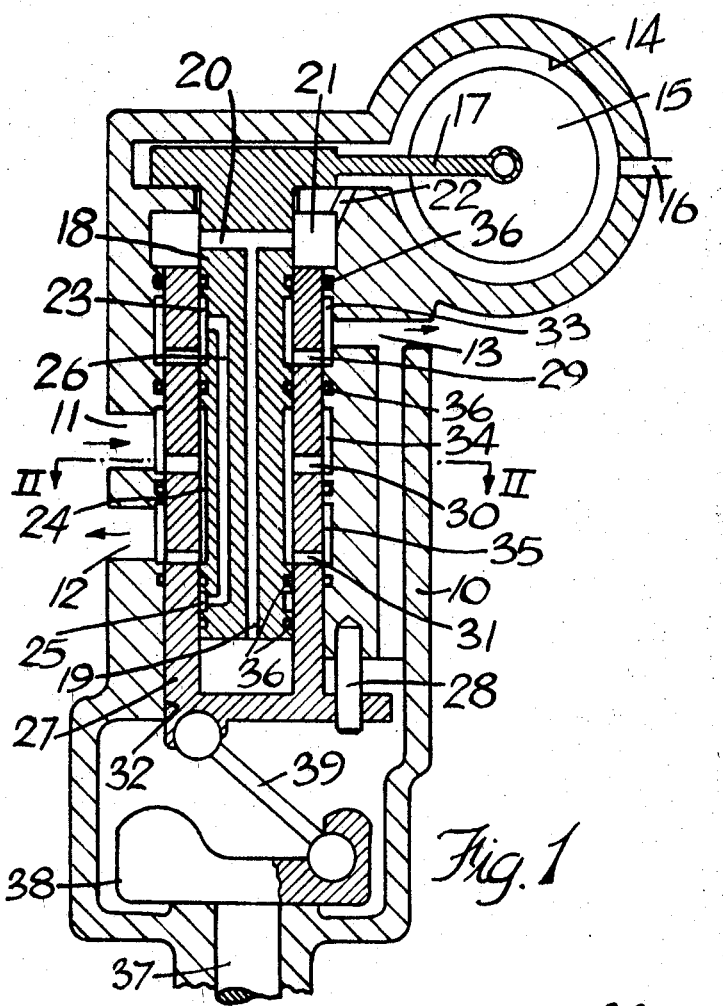
Figure 2:
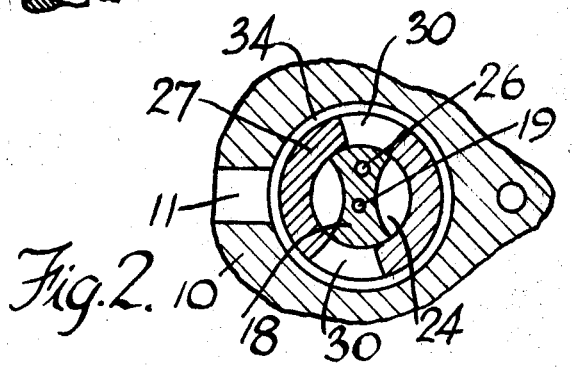

The invention will now be described with reference to the accompanying drawings in which:

FIG. 1 is a cross-sectional view of a valve constructed in accordance with this invention, and FIG. 2 is a fragmentary cross-sectional view on the line 2—2 in FIG. 1, but in which the valve member has been moved angularly.

The valve illustrated is intended for use in a fuel control system for a gas turbine engine. It is intended to control the flow of fluid through a body part 10 in which is provided an inlet passage 11 and an outlet passage 12. The flow through the valve is controlled, in the manner to be described, in accordance with parameters related to operating conditions of the associated engine. There is also a further outlet passage 13 whereby any leakage flow of fluid can be drained to a reservoir (not shown). Within a cylindrical chamber 14, at one end of the body part 10 is disposed a fluid pressure responsive capsule 15 this chamber having an inlet 16 for entry of fluid, such as air, under pressure. One end of the capsule 15 is fixed and it is evacuated so that its length is dependent upon the pressure of the fluid in the chamber 14.

Connected to the free end of the capsule 15 is an arm 17 formed integrally with a valve member 18 of generally cylindrical form.

Changes in the length of the capsule thus control the angular position of the valve member 18 with respect to the body part 10. The valve member 18 has a central longitudinally extending passage 19 terminating near the end at which the arm 17 is provided in a transverse drilling 20. The drilling 20 communicates with a gallery 21 in the body part 10 with the chamber 14 through a hole 22. The external cylindrical surface of the valve member 18 has two spaced annular grooves 23, 25 and between them are a pair of recesses 24 shown in FIG. 2 in cross-section. A further passage 26 in the valve member 18 affords communication between the grooves 23 and 25 which are disposed at opposite sides of the groove 24 respectively.

Between the body part 10 and the valve means 18 is a cylindrical sleeve 27 which is coaxial with the valve member 18 and is slidable axially relatively to the body part 10 and valve member 18. It is, however, prevented from angular movement in the body part 10 by means of a pin 28 angularly off-set from the sleeve axis. Three sets of openings 29, 30 and 31 are provided at spaced intervals in the sleeve 27. The cylindrical cavity 32 of the body part 10 in which the sleeve is mounted has three spaced annular grooves 33, 34, 35 communicating, at all axial positions of the sleeve 27, with the openings 29, 30 and 31 in the sleeve respectively. Moreover the passage 13 communicates with the groove 33, the inlet passage 11 communicates with the groove 34 and the outlet passage 12 communicates with the groove 35.

At all angular positions of the valve member 18 the grooves 23 and 25 therein, which are flanked by seals 36, are in communication with the openings 29 in the sleeve 27 and thus the outlet passage 13, the two grooves 23, 25 communicating through the passage 26.

At the angular setting of the valve member 18 shown in FIG. 2 there is no communication between the recesses 24 and the openings 30 in the sleeve 27 so that the inlet passage 11 does not communicate with the outlet passage 12. However angular movement of the valve member 17 permits such communication through the recesses 24 which are of a length to permit such communication in any axial position of the sleeve 27.

Reciprocatory motion is imparted to the sleeve 27 from a shaft 37 journalled in the body part 10 and which is connected for rotation to the associated engine. The shaft axis is coincident with the axis of the valve member 18. This shaft 37 terminates an enlargement 38 within the body part 10 having, at a position off-set from its rotational axis, a ball ended connecting member 39. The opposite end of this member 39 from the shaft 37 is connected to the sleeve 27 at a position which is off-set from the axis of the sleeve 27. The off-set of the end of the member 39 at the enlargement 38, however exceeds that at the end of the sleeve 27.

It is further to be understood that means for reciprocating the sleeve 27 may be by means of a cam driven by the shaft 37.

Having thus described my invention what I claim as new and desire to secure by Letters Patent is:

1. A valve comprising a body part, a valve member mounted for angular operational movement within the body part, a sleeve disposed between the valve member and the body part, the sleeve and the body part having passages for the flow of fluid through the valve in dependence upon the angular position of the valve member with respect to the body part, an arm on the valve member, a control connected to the arm to impart angular movement to the valve member through the arm, and means for imparting continuous axial reciprocatory motion to the sleeve to remove static friction between the valve member and the sleeve.

2. A valve as claimed in claim 1 in which the means for imparting axial movement comprises a rotatable shaft, carrying, at a position off-set from its rotational axis, a ball ended member, the opposite end of which engages the sleeve.

References Cited

UNITED STATES PATENTS

| | | | |
|---|---|---|---|
| 1,511,425 | 10/1924 | Roucka | 137—330 XR |
| 1,822,667 | 9/1931 | Proell | 137—330 XR |
| 3,040,768 | 6/1962 | Pippenger | 137—330 |

WILLIAM F. O'DEA, Primary Examiner
R. GERARD, Assistant Examiner

U.S. Cl. X.R.
91—430